United States Patent
Bastien et al.

(10) Patent No.: US 9,552,001 B2
(45) Date of Patent: Jan. 24, 2017

(54) THERMAL MANAGEMENT SYSTEM, VEHICLE AND ASSOCIATED METHOD

(75) Inventors: Bertrand Bastien, Erie, PA (US); Henry Todd Young, Erie, PA (US); Ajith Kuttannair Kumar, Erie, PA (US)

(73) Assignee: General Electric Company, Schenectady, NY (US)

(*) Notice: Subject to any disclaimer, the term of this patent is extended or adjusted under 35 U.S.C. 154(b) by 1175 days.

(21) Appl. No.: 13/879,714

(22) PCT Filed: Jul. 27, 2010

(86) PCT No.: PCT/US2010/043303
§ 371 (c)(1),
(2), (4) Date: Apr. 16, 2013

(87) PCT Pub. No.: WO2011/014473
PCT Pub. Date: Feb. 3, 2011

(65) Prior Publication Data
US 2013/0261832 A1    Oct. 3, 2013

Related U.S. Application Data

(60) Provisional application No. 61/228,966, filed on Jul. 27, 2009.

(51) Int. Cl.
*G05D 23/19*    (2006.01)
*G05F 1/26*    (2006.01)
(Continued)

(52) U.S. Cl.
CPC ............... *G05D 23/19* (2013.01); *B60K 11/04* (2013.01); *F01P 7/04* (2013.01); *G06F 1/263* (2013.01);
(Continued)

(58) Field of Classification Search
CPC .......... G05D 23/19; G06F 1/263; B60K 11/04; F01P 7/04; F01P 2005/046; F01P 2025/60
(Continued)

(56) References Cited

U.S. PATENT DOCUMENTS 5,291,960 A * 3/1994 Brandenburg et al. .... 180/65.27
6,601,442 B1   8/2003 Decker et al.
(Continued)

FOREIGN PATENT DOCUMENTS

DE    102 15 686 A1    10/2003

OTHER PUBLICATIONS

Search Report and Written Opinion for corresponding PCT Application No. PCT/US2010/043303, dated Oct. 18, 2010.

*Primary Examiner* — Kenneth M Lo
*Assistant Examiner* — Alan Chu
(74) *Attorney, Agent, or Firm* — John A. Kramer; Global Patent Operation

(57) ABSTRACT

A system includes a cooling system having a cooling fluid for cooling an engine and a radiator fan motor; a dynamic braking system configured to supply electrical energy to the fan motor during a braking event; and a controller that is operable to direct the electrical energy from the dynamic braking system to the fan motor to cool the coolant to a predetermined minimum threshold temperature. A method includes switching a vehicle thermal management system from a first mode of operation in which the coolant is maintained at a steady operating temperature to a second mode of operation in which the coolant is cooled to a minimum threshold temperature.

20 Claims, 4 Drawing Sheets

(51) Int. Cl.
*B60K 11/04* (2006.01)
*F01P 7/04* (2006.01)
*G06F 1/26* (2006.01)
*F01P 5/04* (2006.01)

(52) U.S. Cl.
CPC ...... *F01P 2005/046* (2013.01); *F01P 2025/60* (2013.01)

(58) Field of Classification Search
USPC .......................................................... 700/296
See application file for complete search history.

(56) References Cited

U.S. PATENT DOCUMENTS

| | | |
|---|---|---|
| 7,240,662 B1 * | 7/2007 | Velke ............................ 123/305 |
| 2004/0069546 A1 | 4/2004 | Lou |
| 2004/0164616 A1 * | 8/2004 | Obayashi et al. .............. 307/18 |
| 2005/0005621 A1 * | 1/2005 | Jayadev ......................... 62/230 |
| 2005/0007049 A1 | 1/2005 | Kim |
| 2007/0198132 A1 * | 8/2007 | Yamamoto et al. .......... 700/286 |
| 2007/0213891 A1 * | 9/2007 | Musser ........................... 701/22 |
| 2007/0261648 A1 | 11/2007 | Reckels |
| 2007/0272173 A1 * | 11/2007 | Reckels et al. ............ 123/41.11 |
| 2008/0103635 A1 * | 5/2008 | Vuk .................. B60H 1/00828 700/300 |
| 2008/0269009 A1 * | 10/2008 | Marr ....................... B60L 1/003 477/3 |
| 2010/0071637 A1 * | 3/2010 | Shintani et al. ........... 123/41.02 |

\* cited by examiner

THERMAL MANAGEMENT SYSTEM, VEHICLE AND ASSOCIATED METHOD

BACKGROUND

Technical Field

The invention includes embodiments that relate to a thermal management system for use in vehicle, the vehicle having the system, and an associated method.

Discussion of Art

The engine coolant temperature of a haul truck or dumper has traditionally been controlled by a radiator fan that is mechanically linked to an output shaft of the engine. In particular, the radiator fan can be linked to the engine via a belt and clutch mechanism. The clutch is able to spin the fan at a desired fraction of engine speed, as dictated by a controller. At full engine power, the radiator fan can run at its full speed to provide cooling to the engine.

Running the cooling system comes at a fuel cost and power cost. Accordingly, cooling systems today minimize fuel consumption by picking an operating temperature that is as high as possible, and then maintaining that high temperature using the minimum cooling necessary.

Therefore, it may be desirable to have a vehicle and/or system with properties and charecteristics that differ from those properties of currently available vehicles and systems. It may be desirable to have a method that differs from those methods currently available.

BRIEF DESCRIPTION

In an embodiment, a thermal management system (e.g., for a vehicle) includes a cooling system for cooling an engine, a plurality of energy sources, and a controller. The cooling system has a first electric device that is controllable independent of engine operating speed. (Meaning that the first electric device of the cooling system is not mechanically driven by the engine and that the speed of the first electric device is not tied to the speed of the engine.) Each of the plurality of energy sources is controllable to supply electrical power to the cooling system. The controller is operable to select a first energy source from among the plurality of energy sources and to direct the electrical power from the first energy source to the cooling system for operation of the first electric device. The first energy source is selected based on at least one of an availability of the first energy source and/or an energy cost factor associated with the first energy source supplying the electrical power. ("First" is simply a designation to differentiate one member of a class of elements from other members in the class, and is not meant to denote an order or position.)

In another embodiment, a method (e.g., for thermal management) includes switching a cooling system of a vehicle from a first mode of operation to a second, overcooling mode of operation. In the first mode of operation, a cooling element (associated with an engine of the vehicle) is maintained at a designated maximum threshold temperature during operation of the engine. In the overcooling mode of operation, the cooling system is powered to cool the cooling element from past below the designated maximum threshold temperature to a lower, second threshold temperature.

Another embodiment relates to a vehicle. The vehicle includes an engine, a cooling system for cooling the engine, a first energy source configured to supply electrical power to the cooling system, and a controller. The cooling system has an electric device that is controllable independent of engine operating speed. The controller is operable to direct the electrical power from the first energy source to the cooling system for operation of the cooling system in an overcooling mode. In the overcooling mode, the electric device is powered to continue to cool a cooling element (associated with the engine) from below past a designated maximum threshold temperature to a lower, second threshold temperature.

DESCRIPTION OF FIGURES

The present invention will be better understood from reading the following description of non-limiting embodiments, with reference to the attached drawings, where like element numbers refer to like elements, and wherein below.

DETAILED DESCRIPTION

The invention includes embodiments that relate to a thermal management system for use in vehicle, the vehicle having the system, and one or more associated methods.

In one embodiment, the system implementation includes a vehicle (e.g., a haul truck or dumper) in which one or more auxiliary systems of the vehicle, such as an engine cooling system, can be controlled independently of engine speed. As noted above, this means that an auxiliary system is not mechanically driven by the engine and that the speed or other controllable aspect of the auxiliary system is not tied to the speed of the engine. The auxiliary systems can be powered from different energy sources. Suitable energy sources can include an engine (e.g., electrical power provided by an engine-driven alternator and subsequent power converters such as a rectifier, inverter, and the like); a regenerative braking system or other dynamic braking system; and/or an energy storage system. Suitable energy storage systems may include one or more energy storage devices, such as batteries and other electrochemical devices, flywheels, capacitors, hydraulic accumulators, etc. As used herein, dynamic braking refers to slowing a vehicle by converting vehicle mechanical energy to electrical energy (e.g., through traction motors of the vehicle), and regenerative braking to a type of dynamic braking where braking-generated electricity is selectively stored in an energy storage system (as opposed to dissipating the electricity or immediately using the electricity).

Figure 1:
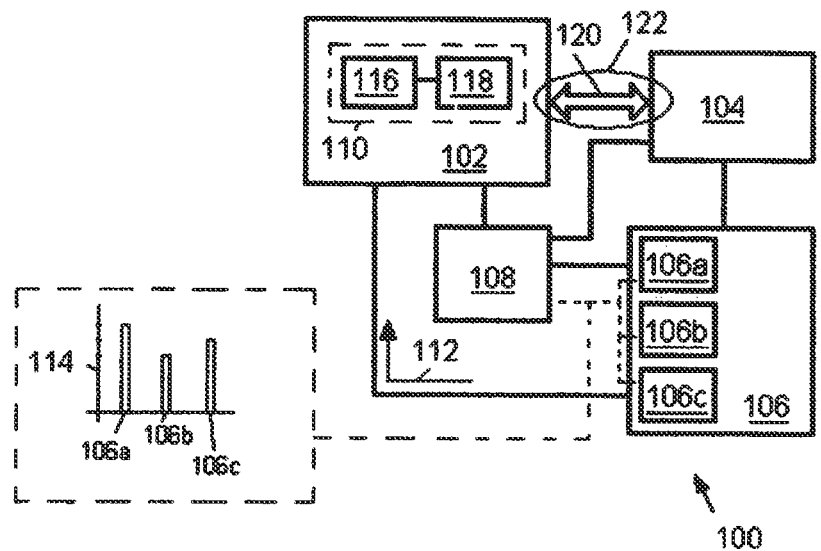
FIG. 1 is a schematic diagram of a thermal management system, according to an embodiment of the invention.

In an embodiment, with reference to FIG. 1, a thermal management system 100 (e.g., for a vehicle) includes a cooling system 102 for cooling an engine 104, a plurality of energy sources 106 (e.g., a first energy source 106a, a second energy source 106b, a third energy source 106c, and so on), and a controller 108. The cooling system 102 has a first electric device 110 that is controllable independent of engine operating speed. (Meaning that the first electric device is not mechanically driven by the engine and that the speed or other controllable aspect of the first electric device is not tied to the speed of the engine.) Each of the plurality of energy sources 106 is controllable to supply electrical power 112 to the cooling system 102. The controller 108 is operable to select a first energy source 106*a* from among the plurality of energy sources 106 and to direct the electrical power from the first energy source 106*a* to the cooling system 102 for operation of the first electric device 110. The first energy source 106*a* is selected based on at least one of (i) an availability of the first energy source and/or (ii) an energy cost factor 114 associated with the first energy source supplying the electrical power 112.

Regarding availability, in an embodiment, an energy source is available if it can currently supply electrical power. Thus, an energy source is not selected if it cannot currently supply electrical power. In this embodiment, if an energy source can currently supply electrical power but not enough power to meet a designated mode, the energy source is still deemed available but augmented with other electrical power. In another embodiment, an energy source is available only if it can currently supply sufficient electrical power to meet a designated load. Thus, in this embodiment, an energy source is not selected if it cannot currently supply sufficient electrical power to meet the designated load. Regarding an energy cost factor 114, the controller 108 contains data/information correlating each energy source to a respective energy cost factor. The energy cost factor is an estimation of what electrical energy from the particular source costs (results in or requires) in terms of one or more system resources or operational parameters. For example, the energy cost factor of each energy source may indicate how much fuel (or fuel equivalent factor) would in effect be consumed for a designated amount of electrical power to be supplied by the energy source. If the energy source is an engine alternator system, then the energy cost factor may be relatively high. On the other hand, if the energy source is a dynamic braking system, then the energy cost factor may be relatively low. If the energy source is an energy storage device, then the energy cost factor may be relatively moderate (between relatively high and low values). Other energy cost factors may relate to vehicle emissions and vehicle performance (e.g., available speed and power). Energy cost factor data/information may be historical (generated by measuring system/vehicle performance over many operational cycles, of the same vehicle and/or other vehicles in the same class) and/or derived concurrently by measuring current system/vehicle performance. Alternatively or in addition, energy cost factors may be arranged or weighted hierarchically based on anecdotal evidence or estimations of vehicle system performance generally. For example, in the case of fuel (or fuel equivalent factor) consumed per unit electrical energy, electrical energy from a dynamic braking system may be considered lower in cost than electrical energy from an energy storage system which is lower in cost than electrical energy from an alternator system, based on general knowledge of vehicle/system operation. The controller may include information on plural energy cost factors for each energy source, in which case an energy source may be selected based on assessing the plural energy cost factors of the various energy sources.

Thus, in an embodiment, the controller 108 determines which energy source (out of a plurality of energy sources 106) is most appropriate to supply electrical power for powering the cooling system 102 (e.g., the electrical power runs the electric device 110) to cool the engine, for reducing the average fuel burn and increasing vehicle productivity. For example, if first and second energy sources are available, and the first energy source has a lower fuel burn-related energy cost factor than the second, then selecting the first energy source for powering the cooling system will result in reduced fuel usage. Further fuel usage and vehicle productivity benefits may be achieved by additionally or alternatively controlling the cooling system in an overcooling mode of operation, as explained elsewhere herein in more detail.

An example of a cooling system electric device 110 is a radiator fan 116 and radiator fan motor 118. The radiator fan 116 is operably coupled to the radiator fan motor 118 (e.g., the radiator fan is attached to an output shall of the radiator fan motor), such that when the radiator fan motor is electrically powered, the radiator fan is rotated. Typically, the radiator fan would be associated with a radiator portion of the cooling system. The radiator fan is controllable independent of engine speed because the radiator fan is not mechanically driven by the engine, but is instead driven by the radiator fan motor. Other examples of cooling system electric devices include blowers, other types of fans, and pumps.

In an embodiment, the cooling system electric device 110 is powered (or the cooling system may be otherwise powered) to cool a cooling element 120 associated with the engine 104. "Cooling element" refers to a portion of the engine that is cooled, or an element that is cooled to in turn cool a portion of the engine. In regards to the former, one example of a cooling element may be an engine manifold (e.g., exahaust or intake manifold), or an engine block or portion thereof. In regards to the latter, one example of a cooling element 120 is a cooling fluid (a coolant such as water mixed with antifreeze) in a fluid circuit 122 associated with the engine 104 and cooling system 102. Another example of a cooling element 120 is cooled air that is blown onto or into the engine for cooling purposes. In the case of a cooling fluid in a fluid circuit 122, the fluid circuit may comprise a cooling fluid reservoir, cooling jackets around an engine block, a water pump, valving or other control elements, a radiator, and tubing/hoses for fluid interconnections. Thus, a radiator fan motor 118 may be electrically powered to drive a radiator fan 116 for blowing air across or through the radiator, for heat exchange from the cooling liquid to the air, and thereby cooling the cooling liquid.

According to one aspect of the invention, the cooling system 102 may be operated in an overcooling mode of operation. In the overcooling mode of operation, instead of maintaining the temperature of a cooling element (e.g., cooling fluid, or engine or vehicle components) at a designated maximum threshold temperature, the cooling element is cooled to a low temperature within an acceptable temperature range, using relatively "low cost" electrical power. The low cost electrical power may be provided from a first energy source 106*a* having a lowest energy cost factor 114 among available energy sources 106. In one example, such a first energy source 106*a* is a dynamic braking system. Overcooling a cooling element will delay the need for cooling when low cost electrical power is no longer available, such as when motoring, effectively resulting in additional traction power available during that period and a lower overall load factor.

Figure 2:
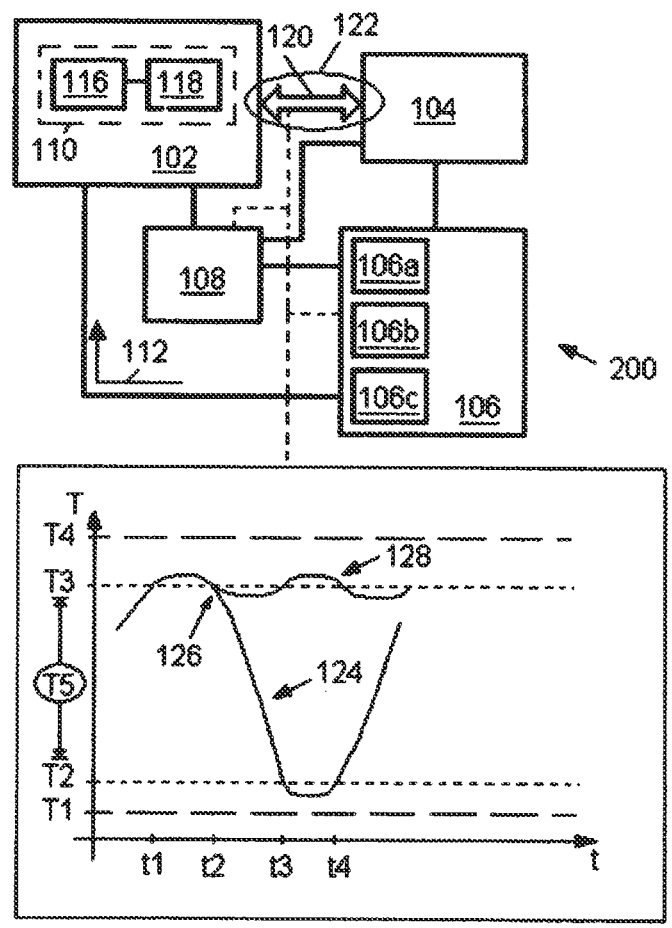
FIG. 2 is a schematic diagram of a thermal management system, according to another embodiment of the invention, illustrating an overcooling mode of operation.

In an embodiment, therefore, with reference to FIG. 2, in a thermal management system 200, a controller 108 is operable to direct electrical power 112 from a first energy source 106*a* to a cooling system 102 for operation of the cooling system 102 in an overcooling mode 124. (Although plural energy sources are shown, it may be the case that the system only has one energy source.) in the overcooling mode 124, a first electric device 110 of the cooling system 102 is powered to continue to cool a cooling element 120 from below past a designated maximum threshold temperature T3 (see point or region 126) to a lower, second threshold temperature T5. (As explained above, the cooling element 120 is associated with the engine 104.)

To explain further, FIG. 2 shows a hypothetical graph illustrating an example plot of temperature T (y-axis) versus time t (x-axis) for a cooling element 120. That is, the graph shows how the temperature T of the cooling element 120 varies over time t, in several possible operating modes of the cooling system in the thermal management system. In the graph, T1 represents a minimum allowed temperature of the cooling element and T4 a maximum allowed temperature of the cooling element, in between which is an allowed temperature range of the cooling element. T1 and T4 may be designated levels, and/or they may represent physical limits of the cooling element (such as a freezing point and point where damage may occur, respectively). In a time period prior to t1, the temperature of the cooling element is rising, for example, due to engine operation. Temperature T3 represents a designated maximum threshold temperature. The designated maximum threshold temperature T3 is the designated temperature at which operation of the cooling system is initiated in order to prevent the cooling element from overheating (e.g., reaching or approaching close to the maximum allowed temperature T4. Thus, before time t1, the cooling system is deactivated (or at least not powered sufficient to prevent the temperature from increasing), and at time t1, corresponding to temperature T3, the cooling system is activated for cooling the cooling element 120.

Between time t1 and time t2, the temperature of the cooling element may continue to rise due to lag time from when the cooling system is activated to when the temperature of the cooling element drops. However, the temperature of the cooling element eventually falls, reflecting that the cooling system is acting to cool the cooling element (e.g., even though the cooling element may continue to receive heat energy from the engine or otherwise, the cooling system acts to lower the net energy level of the cooling element). At time t2, the temperature falls to the designated maximum threshold temperature T3. In a first, "regular" mode of operation 128, subsequent to time t2, the cooling element 120 is maintained at the designated maximum threshold temperature T3 during operation of an engine of the vehicle. "Maintained at" includes keeping the cooling element temperature at the designated maximum threshold temperature T3 and/or cycling the cooling element temperature around the designated maximum threshold temperature T3, such that the designated maximum threshold temperature T3 acts as a trigger for activating the cooling system and, in some embodiments, deactivating the cooling system. Specifically, when the cooling element temperature rises above T3, the cooling system is activated (powered), and, in some embodiments, if the cooling element temperature falls below T3, the cooling system is deactivated (not powered).

In the overcooling mode of operation 124, at time t2, instead of deactivating the cooling system 102, the cooling system 102 is powered to continue to cool the cooling element 120 from below past the designated maximum threshold temperature T3 to the lower, second threshold temperature T5. (The point below past the designated maximum threshold temperature T3 is shown generally at 126.) T5 is shown in FIG. 2 as having a range between T3 and a temperature T2. Temperature T2 is a predetermined minimum threshold temperature, meaning a designated lowest temperature limit below which the cooling system is never powered for further actively cooling the cooling element. In other words, the predetermined minimum threshold temperature T2 is a designated temperature point, at a temperature different from and below the designated maximum threshold temperature T3, to which the cooling element may be cooled but not actively exceeded. Thus, tie second threshold temperature T5 lies below the designated maximum threshold temperature T3 and at or above the predetermined minimum threshold temperature T2. In an embodiment, in the overcooling mode of operation 124, the cooling system 102 is powered to continue to cool the cooling element 120 from below past the designated maximum threshold temperature T3 to the predetermined minimum threshold temperature T2. In an embodiment, the second threshold temperature T5 reflects the lowest temperature, at or above the predetermined minimum threshold temperature T2, that the system is able to achieve during a given overcooling operation based on energy source availability, energy cost factors, vehicle operating parameters, the time available for operating in the overcooling mode, etc.

The predetermined minimum threshold temperature T2 may be coincident with the minimum allowed temperature T1 of the cooling element 120. Alternatively, actively cooling the cooling element (powering the cooling system to cool the cooling element) to the minimum allowed temperature T1 may cause the temperature of the cooling element to fall below the minimum allowed temperature T1. Accordingly, the predetermined minimum threshold temperature T2 may be above the minimum allowed temperature T1, but within a certain range of the minimum allowed temperature T1. For example, depending on cooling system characteristics, the predetermined minimum threshold temperature T2 may be at or within five to twenty percent of the allowed temperature range of the minimum allowed temperature T1. That is, if the allowed temperature range is denoted as R=T4−T1, then $((T1+0.05R) \leq T2 \leq (T1+0.20R))$. In other embodiments, again depending on cooling system characteristics, the predetermined minimum threshold temperature T2 is at or within five to ten percent, or ten to fifteen percent, or fifteen to twenty percent, of the allowed temperature range of the minimum allowed temperature T1.

In FIG. 2, the second threshold temperature T5 is illustrated as coincident with the predetermined minimum threshold temperature T2, which is above the minimum allowed temperature T1. Thus, in the overcooling mode 124, subsequent to time t2, the cooling system 102 is powered to continue to cool the cooling element 120 from below past the designated maximum threshold temperature T3 to the lower, second threshold temperature T5, which in this example is the predetermined minimum threshold temperature T2. Once the temperature of the cooling element reaches the second threshold temperature T5 (the predetermined minimum threshold temperature T2) at time t3, the cooling system is deactivated/de-powered, allowing the cooling element temperature to rise (possibly after a lag) due to continued operation of the engine.

In another embodiment, with reference to FIG. 3, in the overcooling mode 124, a first electric device 110 of the cooling system 102 is powered to continue to cool a cooling element 120 from below past a designated intermediate cycle threshold temperature T6 (see point or region 126) to a lower, second threshold temperature T5. (The designated intermediate cycle threshold temperature T6 is above the second threshold temperature T5 and below the designated maximum threshold temperature T3; thus, continuing to cool a cooling element 120 from below past a designated intermediate cycle threshold temperature T6 is a species/variant of continuing to cool the cooling element from below past a designated maximum threshold temperature T3.) To explain further, in this embodiment, in a first mode of operation 128, the cooling element 120 is maintained at the designated maximum threshold temperature T3 during operation of an engine of the vehicle. Here, "maintained at" more specifically refers to cycling the cooling element temperature around the designated maximum threshold temperature T3 and around the designated intermediate cycle threshold temperature T6. Thus, the designated maximum threshold temperature T3 acts as a trigger for activating the cooling system, and the designated intermediate cycle threshold temperature T6 acts as a trigger for deactivating the cooling system. Specifically, when the cooling element temperature falls below T6 (time t3), the cooling system is deactivated (not powered), and when the cooling element temperature rises above T3 (time t1), the cooling system is activated (powered). In the overcooling mode of operation, instead of deactivating or de-powering the cooling system when the cooling element temperature falls below T6 (time t3), the first electric device 110 of the cooling system 102 is powered to continue to cool the cooling element 120 from below past T6 to a lower, second threshold temperature T5.

Figure 3:
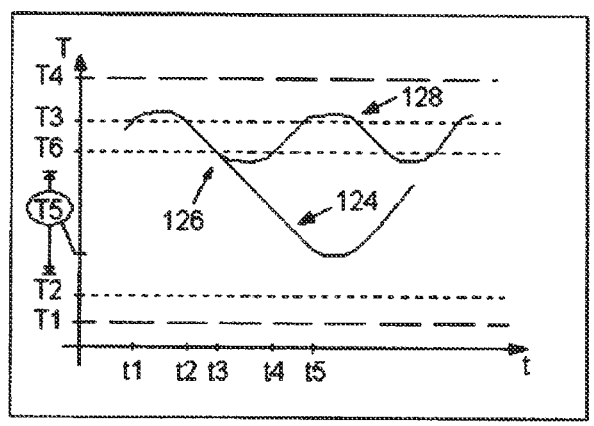
FIG. 3 is a graph illustrating an overcooling mode of operation, in another embodiment.

The embodiment of FIG. 3 illustrates that a first, "regular" (or otherwise) mode of operation 128 may be more complex than simply cycling the cooling system 102 on and off around a single temperature point T3. Thus, regardless of how a cooling system is cycled in a first mode of operation, the overcooling mode provides a mode of operation for continuing to actively cool a cooling element (e.g., by electrically powering an electric device of the cooling system) below the lowest point of the first mode where active cooling is maintained.

Further in regards to the embodiment of FIG. 3, a thermal management system may comprise a cooling system for cooling an engine, one or more energy sources each configured to supply electrical power to the cooling system, and a controller. The cooling system has an electric device that is controllable independent of engine operating speed. The controller is operable to direct the electrical power from at least one of the one or more energy sources to the cooling system for operation of the cooling system in a first mode of operation and in a second, overcooling mode of operation. In the first mode of operation, the electric device is not powered to cool a cooling element (associated with the engine) any lower than a first threshold temperature. In the overcooling mode of operation, the electric device is powered to continue to cool the cooling element below the first threshold temperature to a lower, second threshold temperature.

In a specific example of overcooling, a thermal management system includes a cooling system. 102 for an engine 104, a dynamic braking system 106a, and a controller 108. The cooling system 102 includes a radiator fan motor 116 and a radiator fan 118. The radiator fan motor 116 is coupled to the radiator fan 118 for driving the radiator fan 118. When the radiator fan is driven, it cools a cooling fluid 120 in a fluid circuit 122 associated with the engine 104 and cooling system 102 (e.g., in conjunction with a radiator). The controller 108 monitors the dynamic braking system 106a, and when electrical power 112 is available from the dynamic braking system 106a, the controller 108 directs the electrical power 112 from the dynamic braking system 106a to the radiator fan motor 116, for overcooling the cooling fluid 120. That is, the radiator fan motor 116 is powered to cool the cooling fluid 120 from below past a designated maximum threshold temperature T3 (FIG. 2), or from below past a designated intermediate cycle threshold temperature T6 (FIG. 3), or otherwise below past a lowest temperature at which active cooling of the cooling fluid is continued in one mode of operation 128, to a lower, second threshold temperature T5. The second threshold temperature T5 may be a predetermined minimum threshold temperature T2 of the cooling fluid.

In an embodiment, one of the energy sources 106 is an energy storage system having one or more energy storage devices. The energy storage device may he pre-charged (that is charged when the vehicle is parked and able to connect to a charging station), or it may be charged during operation of the vehicle, such as by receiving electrical power from an engine alternator system, or from an external source (e.g., catenary line or "third rail"-type device), or from a dynamic braking system, or from other charging means (e.g., scavenging elecricity from a turbocharger). If a vehicle has a dynamic braking system, the energy storage device may be electrically coupled to the dynamic braking system, and the energy storage device may be operable to supply electrical power from the dynamic braking system to a cooling system electric device in response to a signal from a controller (regenerative braking). Thus, similar to as previously described above, when dynamic braking energy is available (from the energy storage device or directly), the system will cool a cooling element (e.g., cooling fluid, or engine part or other vehicle part) to a low temperature within an acceptable temperature range. This will delay the need for cooling when dynamic braking energy is no longer available, such as when motoring, effectively resulting in additional traction power available during that period and a lower overall load factor.

A suitable storage system can include a variety of energy storage devices. A suitable energy storage device may include, for example, a sodium metal halide battery, sodium sulfur, lithium ion battery, nickel metal hydride, nickel cadmium, and the like, as well as other energy storage mediums such as capacitors, fuel cells, fly wheel devices, and the like. While the energy storage devices listed here may not be entirely interchangeable in all circumstances, they may be selected based on the end use requirements and constraints.

Figure 4:
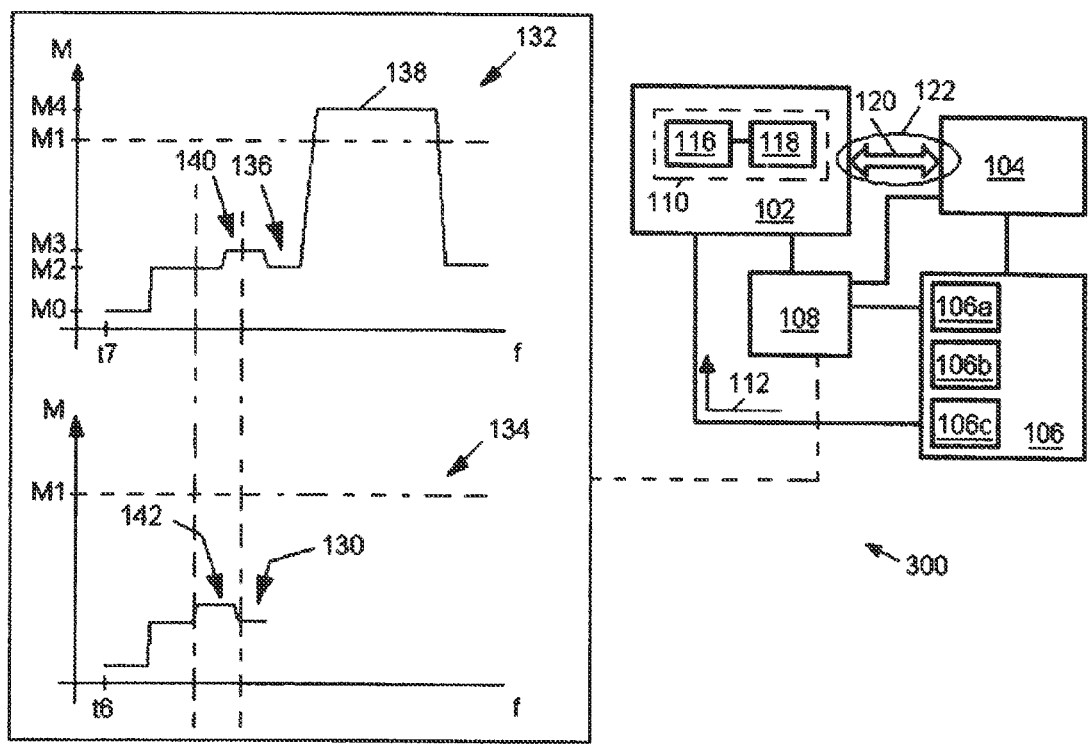
FIG. 4 is a schematic diagram of a thermal management system, according to another embodiment of the invention, illustrating a precooling mode of operation.

In another embodiment, with reference to FIG. 4, an overcooling mode of operation is initiated for precooling purposes. Here, a thermal management system 300 includes a cooling system 102, an engine 104, one or more energy sources 106, and a controller 108. Overall arrangement and operation is similar to what is described above in regards to one or more of FIGS. 1-3. However, the controller 108 is additionally or alternatively configured to identify a time period 130 preceding a load "M" of the engine or vehicle exceeding a designated load threshold "M1," based on a learned duty cycle 132 of the engine. Further, an overcooling mode of operation (such as described above) is initiated during the time period 130.

To explain further, in the thermal management system 300, the system anticipates periods that precede heavy engine load portions of the haul cycle, and precools the engine to delay the need for cooling during the heavy engine load portions. For this purpose, the controller 108 has information about a learned duty cycle 132 of the engine. In a very simple example, a learned duty cycle is simply a measure of engine/vehicle load as a function of time during a cycle of operation, where the cycle is repeated and the measure of load is thereby applicable across multiple repeating cycles. (An example is a haul truck wherein for each cycle of operation, the haul truck runs the same route and performs the same tasks.) In more complex examples, the learned duty cycle incorporates additional factors besides load and time (all factors referred to as "f" in the graphs of FIG. 4), such that load levels can be anticipated not only as a function of time, but also of current vehicle operating conditions/parameters. Methods for generating learned duty cycles are known in the art. For example, see U.S. Pat. No. 6,601,442 to Decker et al.

In the thermal management system 300, the controller 108 is provided with data/information of the learned duty cycle 132. The data/information may be loaded into the controller 108 (e.g., into controller-accessible memory) in advance of vehicle operation. Alternatively or additionally, the controller 108 may be configured to generate a learned duty cycle 132 by monitoring or measuring vehicle operations and processing data of the monitored or measured vehicle operations according to a designated method for generating a learned duty cycle 132. In either case, during vehicle/engine operations, the controller 108 identifies a time period 130 preceding a load M of the engine or vehicle exceeding a designated load threshold M1. The time period 130 is identified based on (i) the learned duty cycle 132, and (ii) one or more monitored or measured operating parameters 134 of the vehicle/engine (e.g., time of operation, fuel usage, emissions output, vehicle speed, and the like). Again in a simple example, for a load/time-based learned duty cycle 132, the controller 108 cross-references the start time t6 of a new, current haul cycle with a start time index t7 of the learned duty cycle 132. From the learned duty cycle, the controller 108 knows that a time period 136 of the learned duty cycle 132 immediately precedes a time period 138 where the engine load M of the learned duty cycle 132 exceeds the threshold M1. The time period 136 is defined not only by time data, but also one or more load waveforms (e.g., 140) that precede the time period 136. For identifying the time period 130, the controller 108 tracks both the current time and the current load, which are correlated to the learned duty cycle 132. For example, in the graphs shown in FIG. 4, a currently measured load waveform 142 corresponds to the learned duty cycle waveform 140 (that precedes the time preceding the heavy load period). Also, the currently measured load waveform 142 is relatively close in time to the learned duty cycle waveform 140. From this, the controller 108 extrapolates that the time period 130 subsequent to the currently measured load waveform 142 likely corresponds to the time period 136 of the learned duty cycle 132, which is expected to immediately precede a load exceeding the threshold M1. For further context, as an example, load M0 may correspond to engine idle, load M2 to motoring along a flat surface, load M3 to a haul truck dump operation, and M4 to the vehicle traversing a steep incline.

Once the controller 108 identifies a time period 130 preceding a load of the engine or vehicle exceeding a designated load threshold, an overcooling mode of operation (such as described above) is initiated during the time period 130, in advance of the anticipated heavy load period. ("Heavy" defined as a load exceeding the designated load threshold.) Initiating an overcooling mode of operation results in a cooling element (e.g., engine component) being cooled ahead of the heavy load period. This delays the need for cooling during the heavy load period, which may result in lowered fuel usage and/or improved vehicle power.

Another embodiment utilizes duty cycle matched cooling. Here, during portions of a duty cycle where cost of cooling is high (e.g., when a vehicle is motoring and under heavy load), the cooling level is set to an estimated level required to minimally meet cooling requirements, such that component temperatures rise using all the thermal capacity of the system while staying within the maximum operating limits. The estimated level may be determined based on learned duty cycle, ambient conditions, etc.

In another embodiment, cooling system operation is controlled based (at least in part) on a determined heat rejection rate. In particular, the controller 108 is configured to determine a heat rejection rate between the cooling system 102 and an external environment based on one or more characteristics of the cooling system 102 and one or more conditions of the external environment. The controller is also configured to control the cooling system based on the heat rejection rate.

In determining the heat rejection rate, the characteristics of the cooling system 102 may include a type of the cooling fluid, a volume of the cooling fluid, a flow rate of the cooling fluid, an age and/or history of the cooling fluid, and/or one or more characteristics of a radiator portion of the cooling system. The one or more conditions of the external environment may include a temperature of the external environment, barometric pressure, etc.

Figure 5:
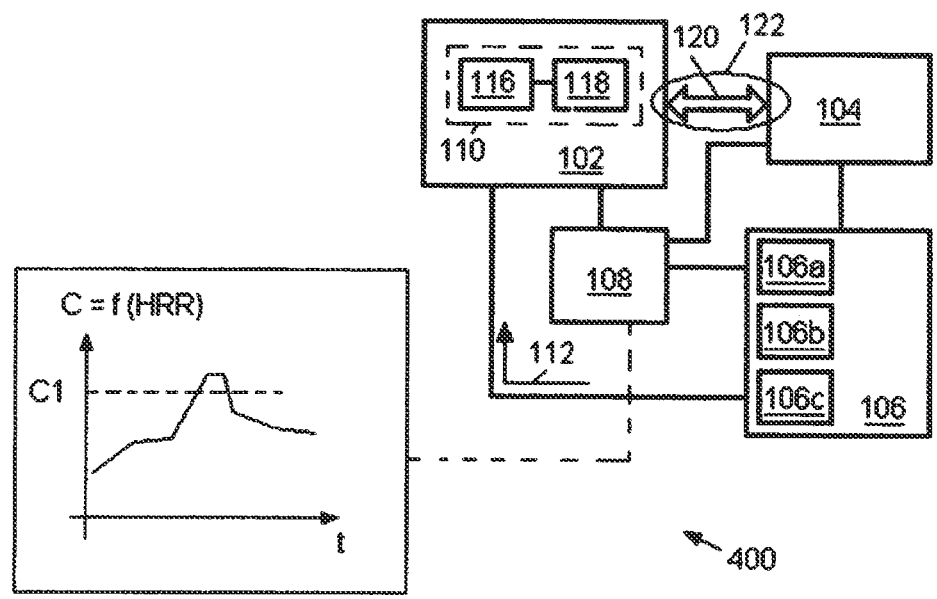
FIG. 5 is a schematic diagram of a thermal management system, according to another embodiment of the invention, illustrating controlling a cooling system based on a determined heat rejection rate.

FIG. 5 shows a more specific example of a thermal management system 400 where cooling system operation is controlled based (at least in part) on a determined heat rejection rate "HRR". In particular, the controller 108 is configured to determine a heat rejection rate HRR between the cooling system 102 and an external environment based on one or more characteristics of the cooling system 102 and one or more conditions of the external environment. (In one example, HRR is determined based on a temperature difference between a temperature of the cooling system (cooling element) and a temperature of the external environment.) The controller 108 is additionally configured to disable the overcooling mode of operation when a cooling cost "C" of cooling the engine 104 (using electrical power from a particular energy source or otherwise) is above a designated cooling cost threshold "C1." (The graph is FIG. 5 is an example illustration of a cooling cost C versus time t curve.) The cooling cost C is determined based at least in part on the heat rejection rate, that is, the cooling cost is a function of the heat rejection rate HRR, C=f (HRR).

In an embodiment, the cooling system 102 is otherwise controlled based on a determined heat rejection rate between the cooling system and the external environment. For example, a cooling level provided by the cooling system (e.g., an airflow provided by electrically powering a radiator fan motor) may be adjusted based on a determined heat rejection rate, so as not to provide more cooling than required. For example, if a determined heat rejection rate is indicative of favorable conditions for heat transfer to the external environment (such as the external temperature being significantly lower than the temperature of the cooling element or system), then the cooling system may be turned off (de-powered), or powered to less of an extent (in terms of power level and/or active/"on" time) than it would be if conditions were less favorable for heat transfer to ambient (external environment).

Other embodiments relate to methods for thermal management (e.g., in a vehicle). In one aspect, a method includes switching a cooling system 102 of a vehicle from a first mode of operation 128 to a second, overcooling mode of operation 124. In the first mode of operation 128, a cooling element 120 (associated with an engine 104 of the vehicle) is maintained at a designated maximum threshold temperature T3 during operation of the engine. In the overcooling mode of operation 124, the cooling system 102 is powered to cool the cooling element 120 from past below the designated maximum threshold temperature T3 to a lower, second threshold temperature T5.

In another embodiment of a method, the cooling element is a cooling fluid in a fluid circuit 122 associated with the engine 104 and cooling system 102. The second threshold temperature is a predetermined minimum threshold temperature T2 of the cooling fluid.

In another embodiment of a method, the step of powering the cooling system 102 in the overcooling mode 124 includes directing electrical power 112 from a dynamic braking system 106a of the vehicle to the cooling system 102.

In another embodiment of a method, the method further includes the steps of determining when the electrical power from the dynamic braking system is available, and initiating the overcooling mode when the electrical power from the dynamic braking system is available.

In another embodiment of a method, the method further includes the step of selecting a first energy source of the vehicle for powering the cooling system in the overcooling mode. The first energy source is selected from among a plurality of energy sources in the vehicle. The first energy source is selected based on at least one of an availability of the first energy source and/or an energy cost factor associated with the first energy source powering the cooling system.

In another embodiment of a method, the method further includes the step of identifying a time period 130 preceding a load M of the engine 104 exceeding a designated load threshold M1, based on a learned duty cycle of the engine. Additionally, the overcooling mode of operation is initiated during the time period, for precooling in advance of a heavy load period.

In another embodiment of a method, the method further includes, for one or more energy sources 106a-106c of the vehicle available for powering the cooling system 102, the step of assessing one or more energy cost factors (114, C) respectively associated with the one or more energy sources. Further, switching to the overcooling mode of operation is precluded if none of the one or more assessed energy cost factors is below a designated cost threshold. That is, in an embodiment, in order to initiate the overcooling mode of operation, the cost factor of at least one available energy source is below a designated threshold (indicative that the available energy is low cost enough to warrant operation in the overcooling mode).

In another embodiment of a method, the method further includes the step of identifying a first assessed energy cost factor of the one or more energy cost factors that is lowest below the designated cost threshold. The cooling system is powered in the overcooling mode of operation using a first one of the one or more energy sources that is associated with the first assessed energy cost factor. For example, with reference to FIG. 1, if all the cost factors 114 of the energy sources 106a, 106b, 106c are below a designated cost threshold, then the identified first assessed energy cost factor would be the one associated with energy source 106b, and the cooling system would be powered in the overcooling mode of operation using electrical power provided by the energy source 106b.

Figure 6:
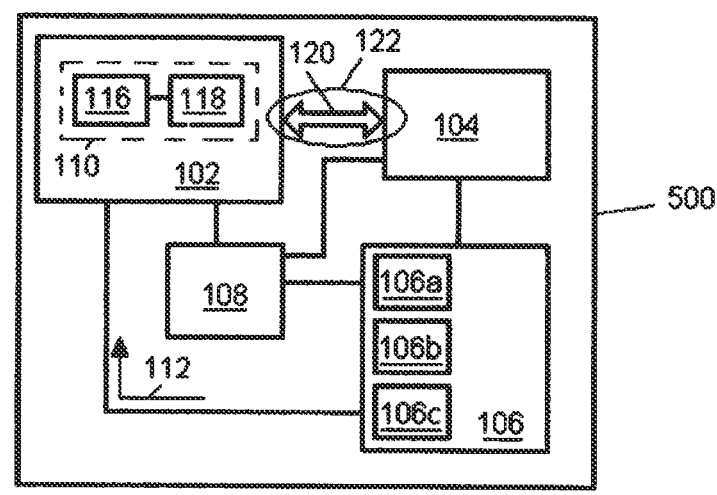
FIG. 6 is a schematic diagram of a vehicle, according to an embodiment.

With reference to FIG. 6, another embodiment relates to a vehicle 500. The vehicle 500 includes an engine 104, a cooling system 102 for cooling the engine, a first energy source 106a configured to supply electrical power 112 to the cooling system, and a controller 108. (Plural energy sources are shown in FIG. 6, but it may be the case that the vehicle has only one energy source.) The cooling system 102 has an electric device 110 that is controllable independent of engine operating speed. The controller 108 is operable to direct the electrical power 112 from the first energy source 106a to the cooling system 102 for operation of the cooling system in an overcooling mode of operation 124. In the overcooling mode, the electric device 110 is powered to continue to cool a cooling element 120 (associated with the engine) from below past a designated maximum threshold temperature T3 to a lower, second threshold temperature T5 (see FIGS. 1 and 3).

In another embodiment of a vehicle, the vehicle has a plurality of energy sources 106, each controllable to supply electrical power to the cooling system. Additionally or alternatively to having functionality for effectuating an overcooling mode of operation, the controller is operable to select a first energy source from among the plurality of energy sources and to direct the electrical power from the first energy source to the cooling system for operation of the electric device. The first energy source is selected based on at least one of an availability of the first energy source and/or an energy cost factor associated with the first energy source supplying the electrical power.

In another embodiment of a vehicle, the electric device of the cooling system comprises a radiator fan and a radiator fan motor coupled to the radiator fan for driving the radiator fan. The cooling element is a cooling fluid in a fluid circuit associated with the engine and cooling system. The first energy source is a dynamic braking system configured to supply the electrical power to the radiator fan motor during a braking event. The controller is operable to direct the electrical power from the dynamic braking system to the radiator fan motor to cool the cooling fluid to the second threshold temperature. The second threshold temperature may be a predetermined minimum threshold temperature of the cooling fluid.

Embodiments of a system, method, or vehicle herein may include a controller to determine which of a plurality of energy sources is the most appropriate to use to provide cooling to the engine and the amount of cooling needed, based on a plurality of external parameters and internal logic. For example, a suitable controller can manage the energy usage to minimize the average fuel burn and maximize the productivity of the truck. The factors and logic may be based, at least in part, on a learned engine duty cycle over the haul profile, engine cooling requirements, availability of energy sources such as state of charge or state of health, impact of energy source on fuel consumption, with the engine itself having the most negative impact and dynamic braking energy having the lowest impact, and the benefit of precooling or other overcooling on productivity and speed on grade.

With regard to overcooling using energy derived from dynamic braking, there are several operational modes from which a controller may select. In one operational mode, when dynamic braking energy is available, the system controller will attempt to cool the engine and vehicle components to a lowest temperature available within the acceptable temperature range. This will delay the need fur cooling until later in the job when dynamic braking energy may no longer be available, such as when motoring. This overcooling may effectively result in additional traction power available during that period and a lower overall load factor.

Another mode of operation may include ambient-matched cooling. The system controller will estimate the heat rejection rate between the cooling system and the environment based on several factors. The factors can include one or more of following: characteristics of the cooling system, heat rejection rate, ambient conditions, and other factors.

Suitable characteristics of the cooling system can include the type of coolant, the volume of coolant, the coolant flow rate, age or history of the coolant (e.g., when the coolant was added/replaced), and specifics related to the radiator design, such as the number of turns, the cleanliness of the radiator fins, age of the pump, and the like. With regard to the heat rejection rate of the engine to the cooling system, the system can calculate the rate, measure the rate, or base the value on predetermined data. For the ambient conditions, suitable conditions can include the time of day, humidity, temperature, barometric pressure, weather type, and dust/dirt levels of operation. Other factors can include historical data calculations for the vehicle in question, or for another vehicle in a fleet of vehicles, or an average of all or a subset of vehicles in the fleet.

During use, the controller can adjust the airflow provided by the cooling system so as to avoid providing more cooling than required and to avoid overcooling the components when the cooling cost function is at or approaching a peak cost. A peak cost may occur, for example, when motoring power is being drawn from the engine as opposed to being drawn from an energy storage system. The system controller may limit the impact of cooling on fuel consumption.

In one embodiment, the controller may institute a pre-cooling or duty-cycle matched cooling mode of operation. In response to the vehicle duty cycle, the system controller anticipates periods preceeding heavy engine load portions of the haul cycle. In response to such periods, the controller precools the engine to delay the need for cooling during the heavy engine load portions. Also, during portions of the cycle where cost of cooling is high, cooling level may be set to an estimated level required based on the above-disclosed factors such that component temperatures rise using all the thermal capacity of the system while staying within the maximum operating limits.

In one embodiment, an engine-speed independent fan driver topology and a dynamic braking energy may be utilized by a controller that anticipates the cooling needs of the engine and its duty cycle to provide cooling in a way that minimizes the impact of cooling on fuel consumption, engine emissions, vehicle power, and/or productivity.

Figure 7:
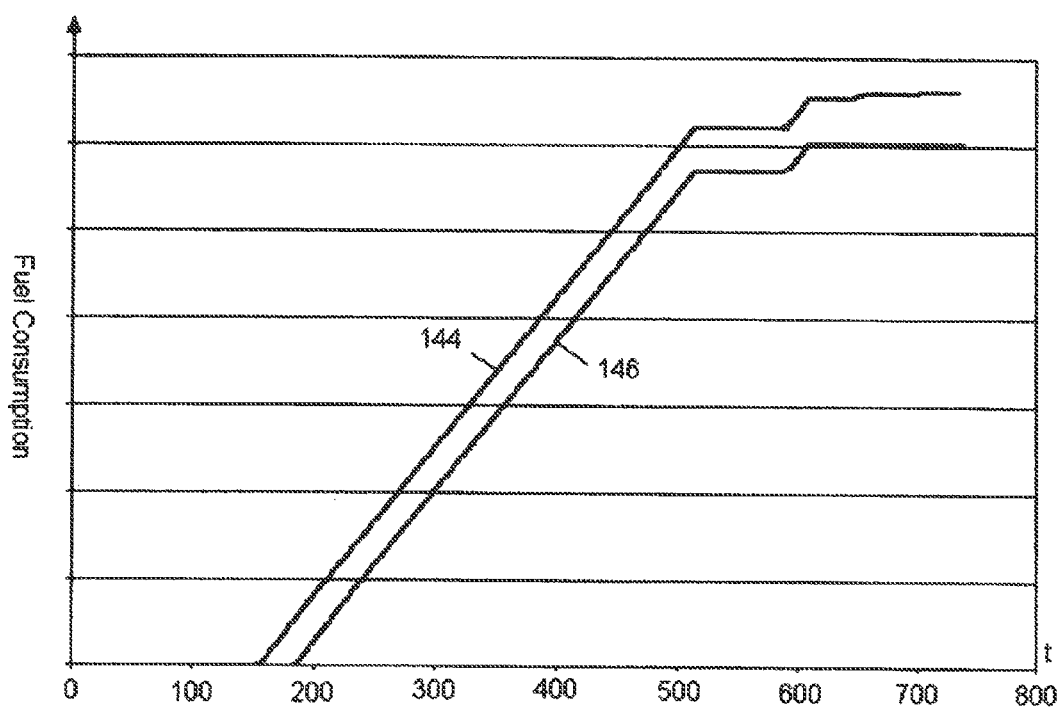
FIG. 7 is a graph showing a comparison of duty cycles.

With reference to FIG. 7, two duty cycles are compared and shown by the indicated graph, which illustrates the effects of overcooling. For example, over the course of driving a full haul truck load of ore up an incline, dumping the load, and returning to the shovel site to collect another ore load, the engine needs to output power to meet the demands of the job. The two lines 144, 146 indicate power usage over elevation with and without overcooling of the coolant in the radiator system. The x-axis is time, and the y-axis is energy expended (in horsepower) to run the radiator fan (which also corresponds, in effect, to fuel consumption). The line 144 shows engagement of the engine at about 160 seconds (in the case of no overcooling), and at about 180 seconds, for line 146, with overcooling. That is, the coolant having a lower temperature takes longer to reach a threshold temperature that will activate the cooling fan motor. Thus, approximately 90 hp which would otherwise be consumed by the fan motor would be available for use in propelling the vehicle for those twenty seconds. All other variables being equal, the vehicle would arrive at the top of the elevation having less thermal load, and would start the non-climb portion of the duty cycle with a cooler temperature than it would otherwise have. On the descent, the controller may divert at least some of the electrical energy flowing from the traction motors into the resistor grid to the radiator fan motor(s). Rather than burning fuel in the engine to cool the system on the descent, the dynamic braking system provides power to cool the coolant to the minimum threshold temperature T2 (or another reduced temperature T5). Thus, less fuel may be consumed during the vehicle descent trip as well.

In an alternative embodiment, as opposed to or in addition to cooling the cooling fluid, the controller can also activate one or more cooling blowers to provide cooling air to one or more of a set of electronic devices, mechanical/structural devices, etc. Suitable electronic devices may include one or more of the control electronics group, power electronics, traction motors, and the like. Suitable mechanical/structural devices may include one or more of the cab environment, lubrication fluid, a thermal heat sink, and/or gearing. Cooling, and particularly overcooling to a minimum threshold temperature, may allow for longer operating periods at sub-maximum operating temperatures due to the lower initial temperature starting point.

In another embodiment, materials are selected for use in the system that have relatively better thermal cycling characteristics to better handle the larger temperature swings of the system components being cooled.

As noted, a thermal management system (or associated method) may be implemented in or as a vehicle. Example vehicles include haul trucks or dumpers, and especially high capacity haul trucks as used in mining operations, e.g., having a capacity of 100-400 tons.

The controller 108 may be a computer, microcontroller, or other electronics device configured for carrying out control functions as described herein, based on stored program instructions, a configuration of the electronics (hardwired control), or the like.

In an embodiment, a thermal management system includes a plurality of "first" operational modes, and in addition to the plurality of first operational modes, an overcooling mode of operation. The plurality of first operational modes comprises all the modes of operation of the thermal management system except for the overcooling mode, that is, there are no other modes of operation other than the first operational modes and the overcooling mode. In all the first operational modes when viewed together, a cooling element is cooled to no lower than a first temperature. In the overcooling mode of operation, the cooling element is cooled to a second temperature that is lower than the first temperature. Thus, out of all the modes of operation of the thermal management system (including the first modes and the overcooling mode), the overcooling mode cools the cooling element to the very lowest temperature out of any and all of the modes. In an embodiment, the cooling element is a cooling fluid, and the thermal management system is in a vehicle. Thus, out of all the modes of operation for cooling the cooling fluid in the vehicle, the overcooling mode cools the cooling fluid to the very lowest temperature out of any and all of the modes.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosed subject matter without departing from its scope. While the dimensions and types of materials described herein are intended to define the parameters of the disclosed subject matter, they are by no means limiting and are exemplary embodiments. The scope of the described subject matter should, therefore, be determined with reference to the appended claims, along with the full scope of equivalents to which such claims are entitled. In the appended claims, the terms "including" and "in which" are used as the plain-language equivalents of the respective terms "comprising" and "wherein." Moreover, in the following claims, the toms "first," "second," and "third," etc. are used merely as labels, and are not intended to impose numerical requirements on their objects.

This written description uses examples to disclose several embodiments of the described subject matter, including the best mode, and also to enable any person skilled in the art to practice the embodiments of subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermal management system, comprising:
   a cooling system for cooling an engine, the cooling system having a first electric device comprising a radiator fan and a radiator fan motor coupled to the radiator fan for driving the radiator fan and that is controllable independent of engine operating speed;
   a plurality of energy sources, each controllable to supply electrical power to the first electric device; and
   a controller configured to select a first energy source from among the plurality of energy sources and to direct electrical power from the first energy source to the first electric device, wherein the first energy source is selected based on an availability of the first energy source and an energy cost factor associated with the first energy source supplying the electrical power relative to respective energy cost factors associated with each other energy source of the plurality of energy sources, each respective energy cost factor including an effective amount of fuel consumed by the engine for a designated amount of electrical power to be supplied by that energy source to the first electric device;
   the controller is configured to direct the electrical power from the first energy source to the first electric device for operation of the cooling system in an overcooling mode, wherein in the overcooling mode the first electric device is powered to continue to cool a cooling element from below past a designated maximum threshold temperature to a lower, second threshold temperature, wherein the cooling element is associated with the engine;
   disabling the overcooling mode of operation in response to reaching a predetermined minimum threshold temperature and in response to an engine fuel usage amount.

2. The system of claim 1, wherein:
   the cooling element is a cooling fluid in a fluid circuit associated with the engine and cooling system;
   the first energy source is a dynamic braking system configured to supply the electrical power to the radiator fan motor during a braking event; and
   the controller is configured to direct the electrical power from the dynamic braking system to the radiator fan motor to cool the cooling fluid to the second threshold temperature.

3. The system of claim 2, wherein the second threshold temperature is the predetermined minimum threshold temperature of the cooling fluid.

4. The system of claim 2, further comprising an energy storage device that is electrically coupled to the dynamic braking system, wherein the energy storage device is configured to supply the electrical power from the dynamic braking system to the radiator fan motor in response to a signal from the controller.

5. The system of claim 1, wherein:
   the controller is configured to identify a time period preceding a load of the engine exceeding a designated load threshold, based on a learned duty cycle of the engine; and
   the overcooling mode is initiated during the time period.

6. The system of claim 1, wherein:
   the controller is configured to determine a heat rejection rate between the cooling system and an external environment based on one or more characteristics of the cooling system and one or more conditions of the external environment; and
   the controller is configured to disable the overcooling mode when a cooling cost of cooling the engine is above a designated cooling cost threshold, the cooling cost being determined based at least in part on the heat rejection rate.

7. The system of claim 6, wherein the cooling element is a cooling fluid in a fluid circuit associated with the engine and cooling system, and the characteristics of the cooling system include a type of the cooling fluid, a volume of the cooling fluid, a flow rate of the cooling fluid, an age and/or history of the cooling fluid, and/or one or more characteristics of a radiator portion of the cooling system.

8. The system of claim 1, wherein:
   the controller is configured to determine a heat rejection rate between the cooling system and an external environment based on one or more characteristics of the cooling system and one or more conditions of the external environment; and
   the controller is configured to control the cooling system based on the heat rejection rate.

9. A method, comprising:
   switching a cooling system of a vehicle from a first mode of operation to a second, overcooling mode of operation;
   in the first mode of operation, maintaining a cooling element at a first threshold temperature during operation of an engine of the vehicle by actively cooling the cooling element when a temperature of the cooling element exceeds the first threshold temperature and not actively cooling the cooling element when the temperature of the cooling element reaches an intermediate threshold temperature lower than the first threshold temperature, wherein the cooling element is associated with the engine;
   in the overcooling mode of operation, powering the cooling system to cool the cooling element from below the first threshold temperature to a lower, second threshold temperature lower than the intermediate threshold temperature; and
   disabling the overcooling mode of operation in response to reaching a predetermined minimum threshold temperature and in response to an engine fuel usage amount.

10. The method of claim 9, wherein the cooling element is a cooling fluid in a fluid circuit associated with the engine and cooling system, and wherein the second threshold temperature is the predetermined minimum threshold temperature of the cooling fluid.

11. The method of claim 9, wherein the step of powering the cooling system in the overcooling mode comprises directing electrical power from a dynamic braking system of the vehicle to the cooling system.

12. The method of claim 11, further comprising:
determining when the electrical power from the dynamic braking system is available; and
initiating the overcooling mode when the electrical power from the dynamic braking system is available.

13. The method of claim 9, further comprising:
selecting a first energy source of the vehicle for powering the cooling system in the overcooling mode, the first energy source being selected from among a plurality of energy sources in the vehicle, and the first energy source being selected based on at least one of an availability of the first energy source and an energy cost factor associated with the first energy source powering the cooling system.

14. The method of claim 9, further comprising:
identifying a time period preceding a load of the engine exceeding a designated load threshold, based on a learned duty cycle of the engine; and
initiating the overcooling mode of operation during the time period.

15. The method of claim 9, further comprising:
for one or more energy sources of the vehicle available for powering the cooling system, assessing one or more energy cost factors respectively associated with the one or more energy sources; and
precluding switching to the overcooling mode of operation if none of the one or more assessed energy cost factors is below a designated cost threshold.

16. The method of claim 15, further comprising:
identifying a first assessed energy cost factor of the one or more energy cost factors that is lowest below the designated cost threshold; and
powering the cooling system in the overcooling mode of operation using a first one of the one or more energy sources that is associated with the first assessed energy cost factor.

17. A vehicle, comprising:
an engine;
a cooling system for cooling the engine, the cooling system having an electric device that is controllable independent of engine operating speed;
a first energy source configured to supply electrical power to the electric device; and
a controller configured to:
responsive to a first condition, direct the electrical power from the first energy source to the electric device for operation of the cooling system in an overcooling mode, wherein in the overcooling mode the electric device is powered to continue to cool a cooling element from below a designated maximum threshold temperature to a lower, second threshold temperature, wherein the cooling element is associated with the engine;
determine a heat rejection rate between the cooling system and an external environment based on one or more characteristics of the cooling system and one or more conditions of the external environment; and
responsive to a second condition, disable the overcooling mode, the second condition including a cooling cost of cooling the engine above a designated cooling cost threshold, the cooling cost determined based at least in part on the heat rejection rate.

18. The vehicle of claim 17, wherein:
the electric device of the cooling system comprises a radiator fan and a radiator fan motor coupled to the radiator fan for driving the radiator fan, and the cooling element is a cooling fluid in a fluid circuit associated with the engine and cooling system;
the first energy source is a dynamic braking system configured to supply the electrical power to the radiator fan motor during a braking event; and
the controller is configured to direct the electrical power from the dynamic braking system to the radiator fan motor to cool the cooling fluid to the second threshold temperature.

19. The vehicle of claim 18, wherein the second threshold temperature is a predetermined minimum threshold temperature of the cooling fluid.

20. The vehicle of claim 18, wherein the second threshold temperature is a lowest temperature to which the cooling fluid is cooled in the vehicle out of all operational modes of the vehicle.

* * * * *